Oct. 25, 1949.  G. F. McINTOSH  2,486,309
ELECTRIC HEATER
Filed March 27, 1947
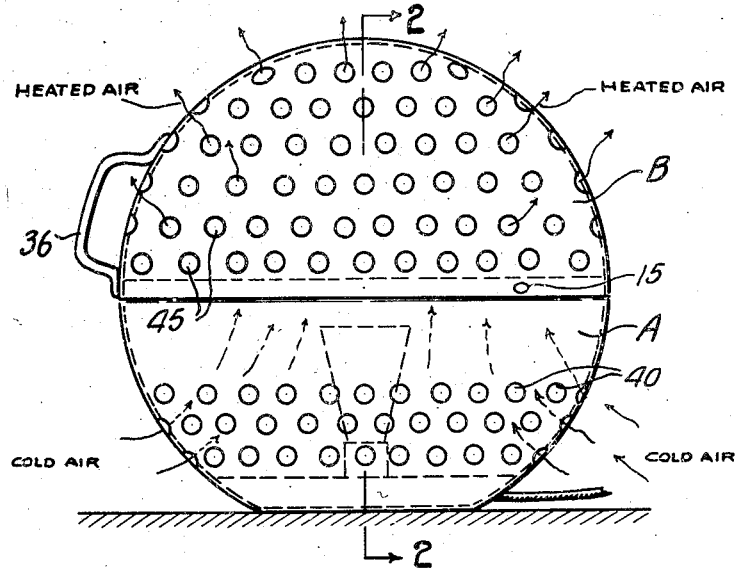
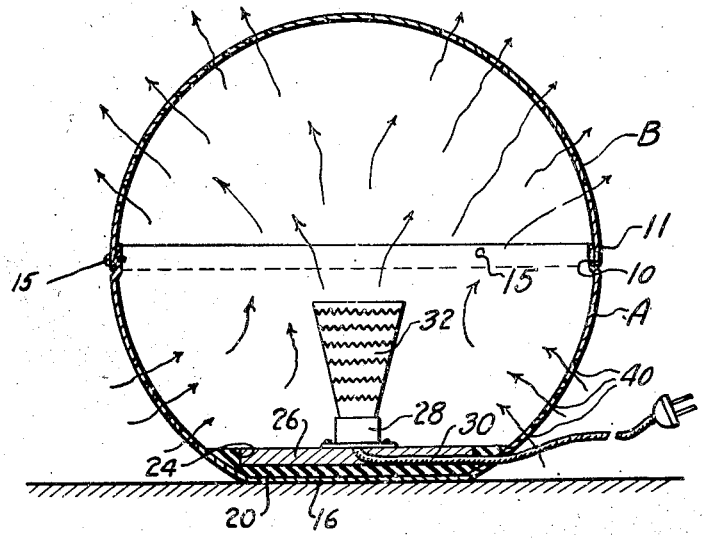
INVENTOR
George F. McIntosh

UNITED STATES PATENT OFFICE 2,486,309

ELECTRIC HEATER

George F. McIntosh, Paris, Ky.

Application March 27, 1947, Serial No. 737,477

7 Claims. (Cl. 219—38)

This application relates to a space heater.

Various devices have been developed for the heating of individual rooms either to supplement a central heating system, or to serve as a heater for damp or cold weather in climates where no central heating system is provided. These heaters have taken the form of reflection heaters of the type in which a copper or other highly polished parabolic reflector has an electrical element at the center for directing a heat beam outward into the room. Other heaters have been of the electric steam type wherein steam is formed within a radiator which heats the air of a room by normal air flow.

The present invention contemplates an electric heater which is intended to be an improvement over the usual type of reflector heater or other known types of direct air heaters.

An object of the invention is a heater design in which the element is entirely protected against accidental contact so that it is especially safe where small children are apt to be playing.

Another object of the invention is the provision of a heater which has inherent stability but which, even if turned over accidentally, will not cause burning or any disturbance of the heating elements.

Another object is the provision of a heater which will pick up cold air at floor level and direct it upwardly so that an entire room may be heated quickly due to normal air circulation.

A further object is the provision of a self-cooling heater design which permits the heater to be touched or moved from one place to another during a heating cycle without danger.

Other objects and features of the invention have to do with the details of construction and design, as will be evident in the following description and claims.

In the drawings:

Figure 1 is a side elevation of the heater.

Figure 2 is a vertical section on line 2—2 of Figure 1 illustrating the interior construction of the heater.

Referring to the drawings, two semi-spherical shells A and B are shown joined equatorially with overlapping portions. The upper circumferential edge of the shell A is reduced in cross section at 10 so that it may be overlapped by edge 11 of the shell B. These shells, which are preferably made of metal, may be permanently joined together by brazing or soldering. If it is desirable to leave the parts separable to permit replacement of the heating element, they can then be joined by small bolts 15.

The pole end of the shell A is flattened at 16 to serve as a base or resting portion. A heat insulating insert 20 is fitted to the flattened base and designed to extend upwardly along the walls a short distance. This insert 20 is preferably preformed with a disc-like opening 24. The insulating insert may be fastened into the bottom by any conventional means. It is preferably fastened in by an adhesive cement (not shown).

The disc-like opening formed in the insulating insert 20 is designed to receive a round plate 26 formed of heavy material such as iron or lead. On this plate 26 is mounted a conventional screw socket electrical outlet 28 from which a cord 30 extends outwardly through the edge of the insulating insert 20, and through a hole in the wall of sphere member A. A heating element 32 mounted in the socket 28 extends toward the center of the shell. This heating element may be a standard screw-in type in which a resistance wire is wound in grooves formed in a ceramic supporting core. On the top shell B a handle 36 is fastened so that the heater can be readily lifted and moved.

Around the base of the completed sphere holes 40 are cut through the walls to provide air inlet openings. Diametrically opposed to these holes 40 are holes 45 in the top sphere member B to serve as outlet holes for heated air.

In the operation the portable heater may be placed in any room and the wire 30 connected to an electrical outlet. The heating element 32 will then create an up-draft within the sphere which will draw cold air in the lower holes 40 and force it out of the upper holes 45. At all times the air passing through the outer shell of the heater will maintain the shell at such a temperature that there is no danger in handling the heater. Consequently, the heater may be picked up and moved even as it is being used, and there is no likelihood of injury to children who might be playing in the vicinity. Furthermore, the heater is inherently stable and regardless of the position in which it is left it will always right itself to the position shown in the drawings. The insulation insert surrounding the stabilizing plate will protect any surface that the heater is resting on from excessive temperatures, since it surrounds the plate at all points where it might contact the metal shell.

What I claim is:

1. A self-cooling, inherently stable space heater comprising a spherical sheet metal shell flattened slightly at one pole, means on the shell to weight the flattened portion to provide stability, and an electrical resistance element mounted within said shell, the shell being provided with a plurality of air inlet holes adjacent the flattened pole and a plurality of air outlet holes in that part of the shell diametrically opposed to the air inlet holes.

2. A space heater comprising a spherical sheet-metal shell apertured substantially around its surface, an electric heating element within the shell, a stabilizing weight mounted adjacent one pole of the spherical shell, and a heat insulating insert interposed between said weight and the interior of said shell.

3. A space heater comprising a spherical sheet-metal shell apertured substantially around its surface, an electric heating element within the shell, and a standard screw socket electrical outlet mounted on said stabilizing weight to receive the heating element which will project toward the center of the sphere.

4. A space heater comprising a spherical sheet-metal shell apertured substantially around its surface, an electric heating element within the shell, a stabilizing plate mounted adjacent one pole of the spherical shell but spaced therefrom at all points, the heating element being mounted on said plate.

5. A space heater comprising a spherical sheet-metal shell, means to stabilize the shell in one position on a flat surface, a series of perforations in said shell to serve as air inlets adjacent the bottom of the shell when so stabilized, a series of perforations in the top semi-spherical surface to serve as outlets for heated air, and an electrical heating element within said shell.

6. A space heater comprising two semi-spherical sheet-metal shells having equatorial edges adapted to interengage and overlap, the pole of one shell being flattened and weighted to provide stability for the assembly, and a heating element within the assembled shells which are apertured to provide air inlets and outlets.

7. A space heater comprising two semi-spherical sheet metal perforated shells having equatorial edges adapted to interengage and overlap, the pole of one shell being flattened and stabilizing means consisting of a disc-like piece of heavy metal fastened to the flattened wall of the shell, and a heating element on said metal disc projecting centerwise.

GEORGE F. McINTOSH.

REFERENCES CITED

The following references are of record in the file of this patent:

UNITED STATES PATENTS

| Number | Name | Date |
| --- | --- | --- |
| 1,374,591 | Lightfoot | Apr. 12, 1921 |
| 1,755,204 | Buffalow et al. | Apr. 22, 1930 |
| 1,908,054 | Riley et al. | May 9, 1933 |